United States Patent [19]
Matsumoto et al.

[11] Patent Number: 5,914,566
[45] Date of Patent: *Jun. 22, 1999

[54] LIGHTING CIRCUIT FOR APPLYING A NEGATIVE AC VOLTAGE TO A DISCHARGE LAMP

[75] Inventors: Akihiro Matsumoto; Masayasu Yamashita; Jun Yabuzaki, all of Shimizu, Japan

[73] Assignee: Koito Manufacturing Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/778,749

[22] Filed: Jan. 6, 1997

[30]  Foreign Application Priority Data

| Jan. 8, 1996 | [JP] | Japan | 8-017017 |
| Jun. 10, 1996 | [JP] | Japan | 8-168683 |

[51] Int. Cl.⁶ .................................................. H05B 37/02
[52] U.S. Cl. .......................... 315/82; 315/276; 315/224; 315/219; 315/307
[58] Field of Search ............................. 315/307, 82, 276, 315/224, 219; 307/10.8

[56]  References Cited

U.S. PATENT DOCUMENTS

| 5,140,229 | 8/1992 | Yagi et al. ............................. 315/219 |
| 5,142,203 | 8/1992 | Oda et al. ............................. 315/308 |
| 5,151,631 | 9/1992 | Oda et al. ............................. 315/127 |
| 5,212,428 | 5/1993 | Sasaki et al. ........................... 315/82 |
| 5,278,452 | 1/1994 | Matsumoto et al. .................. 307/10.8 |
| 5,295,036 | 3/1994 | Yagi et al. ............................. 361/79 |
| 5,397,965 | 3/1995 | Gorille et al. ........................ 315/209 |
| 5,422,548 | 6/1995 | Yamashita et al. .................... 315/308 |
| 5,449,973 | 9/1995 | Yamashita et al. ...................... 315/82 |
| 5,485,059 | 1/1996 | Yamashita et al. .................... 315/307 |
| 5,486,740 | 1/1996 | Yamashita et al. .................... 315/308 |
| 5,498,933 | 3/1996 | Nakamura ............................. 315/205 |
| 5,514,935 | 5/1996 | Oda et al. ............................... 315/82 |

FOREIGN PATENT DOCUMENTS

| 0 647 085 A1 | 9/1994 | European Pat. Off. . |
| 0 684 754 A1 | 4/1995 | European Pat. Off. . |
| 0 567 108 A1 | 4/1996 | European Pat. Off. . |
| 44 00 412 A1 | 1/1994 | Germany . |
| 2 243 503 | 10/1991 | United Kingdom . |

*Primary Examiner*—Michael B. Shingleton
*Attorney, Agent, or Firm*—Sughrue, Mion, Zinn, Macpeak & Seas, PLLC

[57]  ABSTRACT

A lighting circuit for a discharge lamp has input terminals to which a DC power supply is to be connected, a DC power supply circuit for converting a DC input voltage to a predetermined voltage, and a DC-AC converter for converting the output voltage of the DC power supply circuit to an AC voltage and then supplying the AC voltage to the discharge lamp. A transformer is incorporated in the DC power supply circuit as insulator means for insulating the circuit portion at its input stage from the circuit portion at its output stage. The transformer has its high-voltage output terminal connected to a ground-side one of the input terminals to supply a negative rectangular-wave voltage to the discharge lamp.

13 Claims, 6 Drawing Sheets

LIGHTING CIRCUIT FOR APPLYING A NEGATIVE AC VOLTAGE TO A DISCHARGE LAMP

BACKGROUND OF THE INVENTION

1. Field of the Invention

The present invention relates to a novel lighting circuit for a discharge lamp, which supplies a negative AC voltage to a discharge lamp for ignition to prevent partial leakage of metal ions from the discharge lamp during lighting, thereby preventing a chromaticity change in the light from the discharge lamp.

2. Description of the Related Art

Recently, a compact discharge lamp (e.g., a metal halide lamp) is receiving greater attention as a light source which is a substitute for an incandescent lamp. It is known that a lighting circuit for such a discharge lamp, as adapted to a light source, for example, for a vehicular lamp, includes a DC power supply, a switching power supply circuit, a DC-AC converter, and an igniter circuit positive voltage converter.

A sinusoidal wave or a positive rectangular wave is used as an AC wave which is to be supplied to the discharge lamp.

It is known that when a positive AC voltage is supplied to a discharge lamp to light it, some of metal ions in the discharge lamp leak if there is a metal member (e.g., a reflector or the like) near the discharge lamp. A chromaticity change in the light from the discharge lamp originated from this phenomenon may impair the color rendering property or the like of the discharge lamp, shorten the service life of the lamp or cause other adverse influences.

If the potential around the arc tube of a metal halide lamp is low when metal atoms sealed in this arc tube are ionized at the time of ignition, for example, most of metal ions, though attracted by the silica glass tube which constitutes the arc tube, are shielded by the silica glass tube and do not leak therefrom. However, those metal ions which penetrate the silica glass, like sodium ions, may pass through the tube. This phenomenon is known as Na loss.

SUMMARY OF THE INVENTION

Accordingly, it is an objective of the present invention to provide a lighting circuit for a discharge lamp, which prevents partial leakage of metal ions from the discharge lamp during lighting, without complicating the constitution of the lighting circuit.

To achieve this object, a lighting circuit for a discharge lamp according to this invention comprises input terminals to which a DC power supply is to be connected; a DC power supply circuit for converting an input voltage from the input terminals to a predetermined voltage; a DC-AC converter for converting an output voltage of the DC power supply circuit to an AC voltage and supplying the AC voltage to the discharge lamp; and insulator means, incorporated in the DC power supply circuit, for insulating a circuit portion at an input stage from a circuit portion at an output stage, the insulator means having a high-voltage output terminal connected to a ground-side one of the input terminals According to this invention, a negative AC voltage is supplied to a discharge lamp for ignition, so that even when there is a metal member near the discharge lamp, the potential around the arc tube does not become lower than that of the discharge elect It is therefore possible to prevent metal ions from leaking from the discharge lamp.

DETAILED DESCRIPTION OF THE PREFERRED EMBODIMENT

Figure 1:
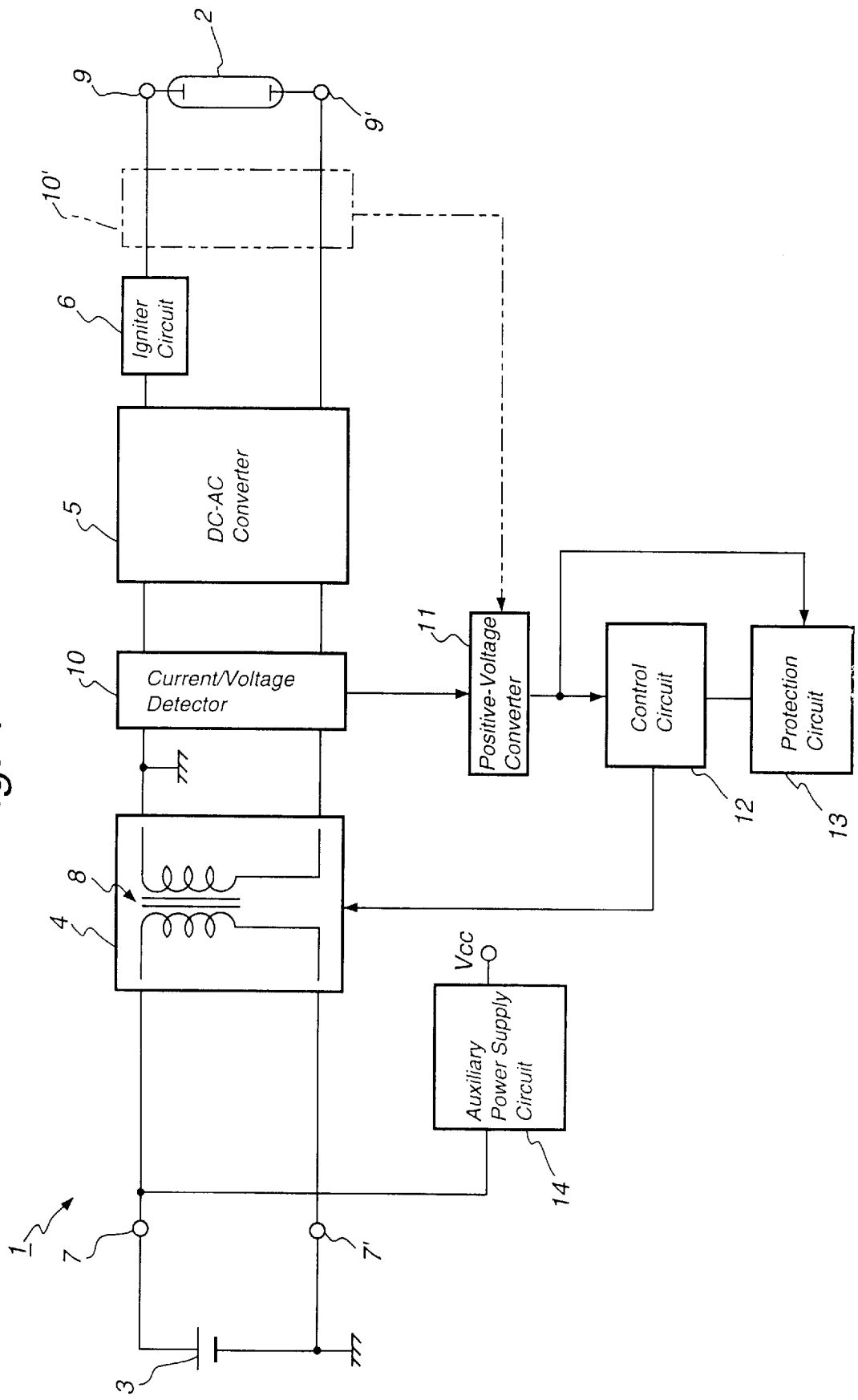
FIG. 1 is a circuit block diagram for explaining the constitution of a lighting circuit for a discharge lamp according to this invention.

FIG. 1 shows the structure of a discharge lamp lighting circuit 1 according to this invention. The circuitry of the lighting circuit 1 which supplies power to a discharge lamp 2 has a DC power supply 3, a DC power supply circuit 4, a DC-AC converter 5 and an igniter circuit 6, and is designed to be able to supply a negative AC voltage to the discharge lamp 2 for ignition.

The DC power supply 3 is connected input terminals 7 and 7' which are respectively connected to the input terminals of the DC power supply circuit 4. The input terminal 7 is a positive terminal and the input terminal 7' is a ground terminal.

The DC power supply circuit 4 converts the voltage from the DC power supply 3, supplied thereto by the ON action of an unillustrated ignition switch, to a predetermined DC voltage and supplies this DC voltage to the DC-AC converter 5 at the subsequent stage. This DC power supply circuit 4 has insulator means 8 (transformer or the like) for insulating the input stage from the output stage. The insulator means 8 has the high-potential terminal of the output stage connected to the aforementioned ground-side input terminal 7' to have the same potential as that of the input terminal 7'. The DC power supply circuit 4 may have a known structure, such as the forward type, fly back type, half-bridge type or full-bridge type.

Figure 2:
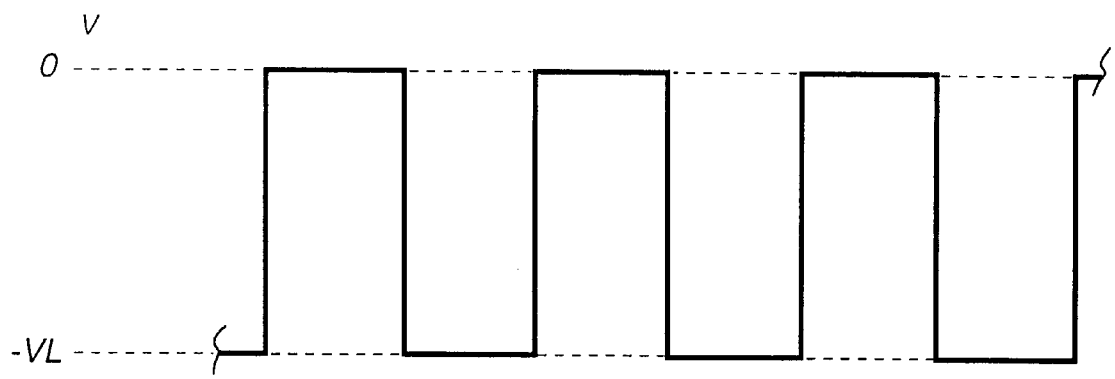
FIG. 2 is a diagram showing a negative AC waveform.

The DC-AC converter 5 produces a negative AC voltage based on the output voltage of the DC power supply circuit 4 and supplies the AC voltage to the discharge lamp 2. For example, the DC-AC converter 5 supplies a rectangular voltage having an amplitude VL, as shown in FIG. 2, to the discharge lamp 2. Even if there is a metal member like a reflector near the discharge lamp 2 during lighting, therefore, the potential around the arc tube does not become lower than that of the discharge electrode. This prevents metal ions from partially leaking from the arc tube of the discharge lamp 2.

The igniter circuit 6 generates a trigger pulse to the discharge lamp 2, superimposes this trigger pulse on the AC voltage output from the DC-AC converter 5 and applies the resultant voltage to the discharge lamp 2 connected between AC output terminals 9 and 9' to trigger the discharge lamp 2.

The circuitry of a lighting control system, which ensures reliable activation of the discharge lamp 2 and safer ignition, includes a current/voltage detector 10, a positive voltage converter 11 and a control circuit 12.

The current/voltage detector 10 detects the lamp voltage and/or the lamp current of the discharge lamp 2 or acquires signals equivalent to the lamp voltage and lamp current. The current/voltage detector 10 is provided between the DC power supply circuit 4 and the DC-AC converter 5 as illustrated to detect the output voltage and the output current of the DC power supply circuit 4, or may be provided at the subsequent stage of the DC-AC converter 5 as indicated by an alternate one long and two short dashes line with reference numeral "10'" in FIG. 1 to directly detect the lamp voltage and the lamp current of the discharge lamp 2.

The positive voltage converter 11 is provided to convert the voltage detected by the current/voltage detector 10 to a positive voltage and send it to the control circuit 12. This conversion is necessary because the output voltage of the DC power supply circuit 4 is negative and the output voltage of the DC-AC converter 5 is negative so that the voltage signal and current signal detected by the current/voltage detector 10 would become negative without such conversion.

In accordance with the output voltage of the positive voltage converter 11 to control the output voltage and/or the output current of the DC power supply circuit 4, the control circuit 12 sends a predetermined control signal to the DC power supply circuit 4 to encourage the light of the discharge lamp 2 at the initial lighting stage, thus shortening the activation time or reactivation time of the discharge lamp 2, or to perform control necessary to ensure the stable lighting of the discharge lamp 2 with the rated power.

The lighting circuit 1 further comprises a protection circuit 13, which stops supplying power to the discharge lamp 2 when detecting an abnormality in the discharge lamp 2 or the lighting circuit 1, and an auxiliary power supply circuit 14, which produces a predetermined supply voltage (indicated by "Vcc" in FIG. 1) based on the supply voltage from the DC power supply 3 and supplies this produced voltage to the control circuit 12, the protection circuit 13, the DC-AC converter 5 and the like.

Figure 3:
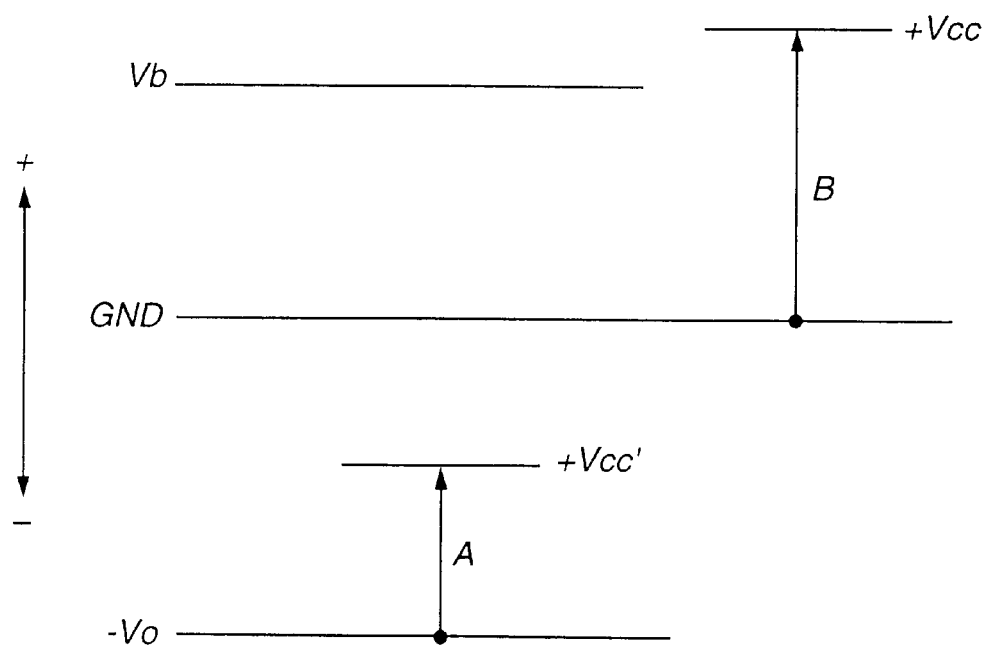
FIG. 3 is a diagram for explaining potentials associated with the lighting circuit.

One should be careful about how to ground the control circuit 12, the protection circuit 13, and the like when a negative AC voltage is to be supplied to the discharge lamp. FIG. 3 is a diagram for explaining potentials associated with the lighting circuit 1; "Vb" is the supply voltage of the DC power supply 3, "GND" is the ground potential (i.e., the potential of the input terminal 7') and "−Vo" is the output voltage of the DC power supply circuit 4.

The aforementioned grounding may be accomplished by connecting the ground terminals of the control circuit 12 and the protection circuit 13 to the low-potential one of the output terminals of the DC power supply circuit 4 and supplying a voltage of "+Vcc'" indicated by the arrow A to the power supply terminals of the control circuit 12 and the protection circuit 13, or by connecting the ground terminals of the control circuit 12 and the protection circuit 13 to the input terminal 7' and supplying a voltage of "+Vcc" indicated by the arrow B to the power supply terminals of the control circuit 12 and the protection circuit 13.

The former scheme, however, suffers the unstable circuit operation when the level change of −Vo is violent at the initial lighting stage of the discharge lamp, or requires a special circuit for converting the voltage level when signals are exchanged between the control circuit 12 or the protection circuit 13 and the preceding stage of the DC power supply circuit 4, or needs a complex structure for the power supply circuit which generates the voltage of +Vcc'.

The latter scheme (which connects the ground terminals of the control circuit 12 and the protection circuit 13 to the input terminal 7' and supplies a predetermined voltage to the power supply terminals of the control circuit 12 and the protection circuit 13) can prevent those circuits 12 and 13 from being affected by the level change of −Vo and can contribute to simplifying the circuit structure. Although the positive voltage Vcc is produced by the auxiliary power supply circuit 14 in FIG. 1, the supply voltage Vb of the DC power supply 3 may be used in place of Vcc when the voltage Vb is stable and can directly be supplied to the control circuit 12, the protection circuit 13 and the like.

Figure 4:
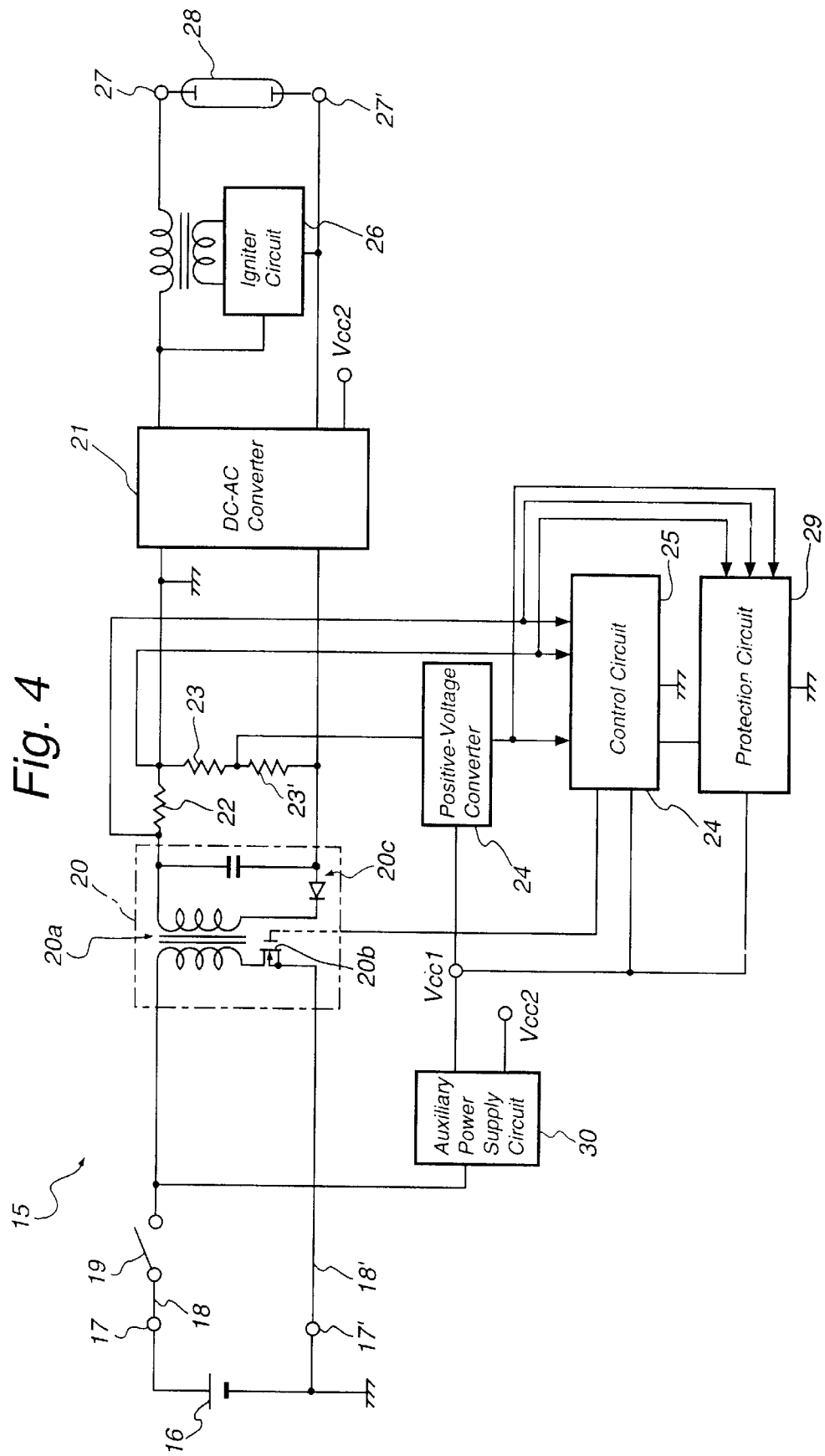
FIG. 4 is a block diagram illustrating the circuit structure of one embodiment of this invention.
Figure 5:
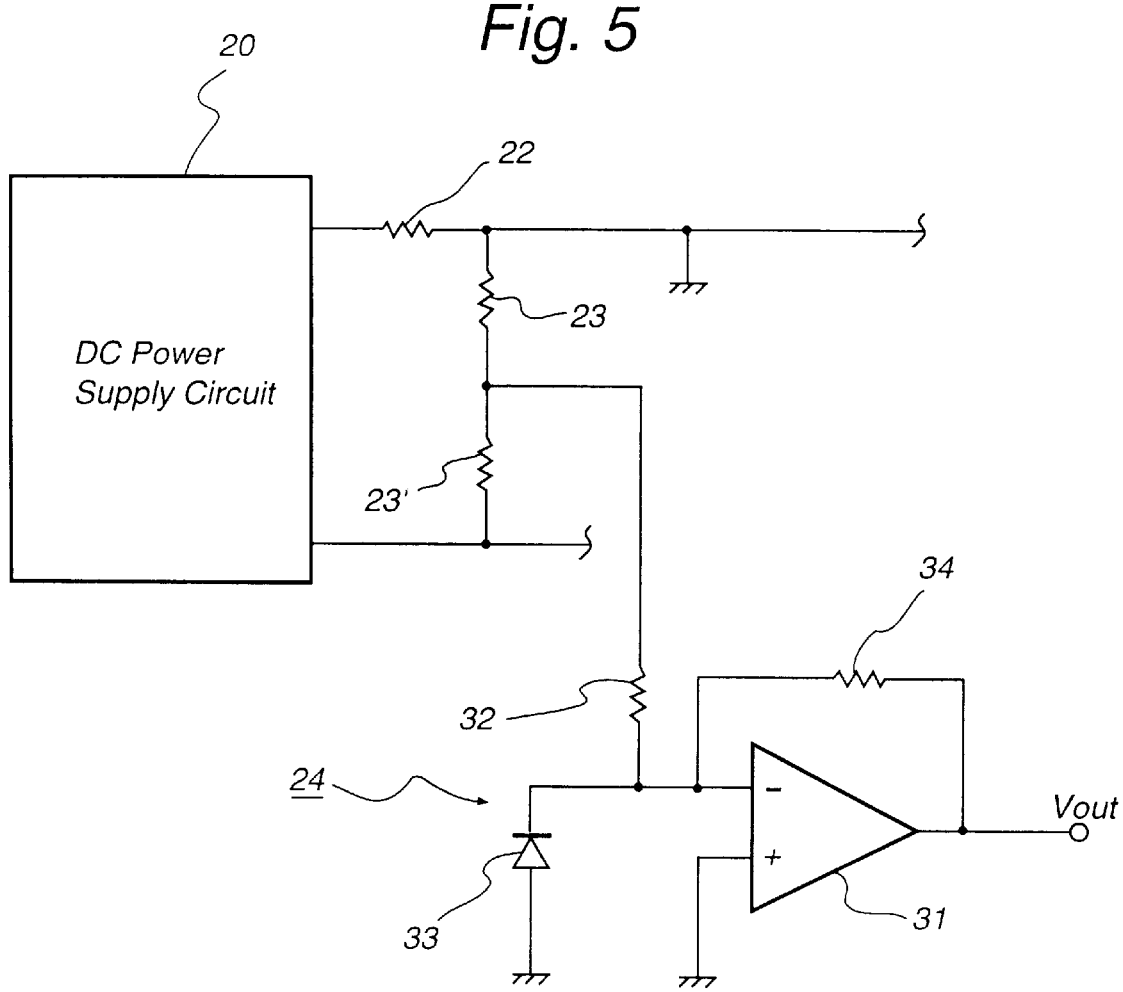
FIG. 5 is a circuit diagram exemplifying the structure of a positive voltage converter.
Figure 6:
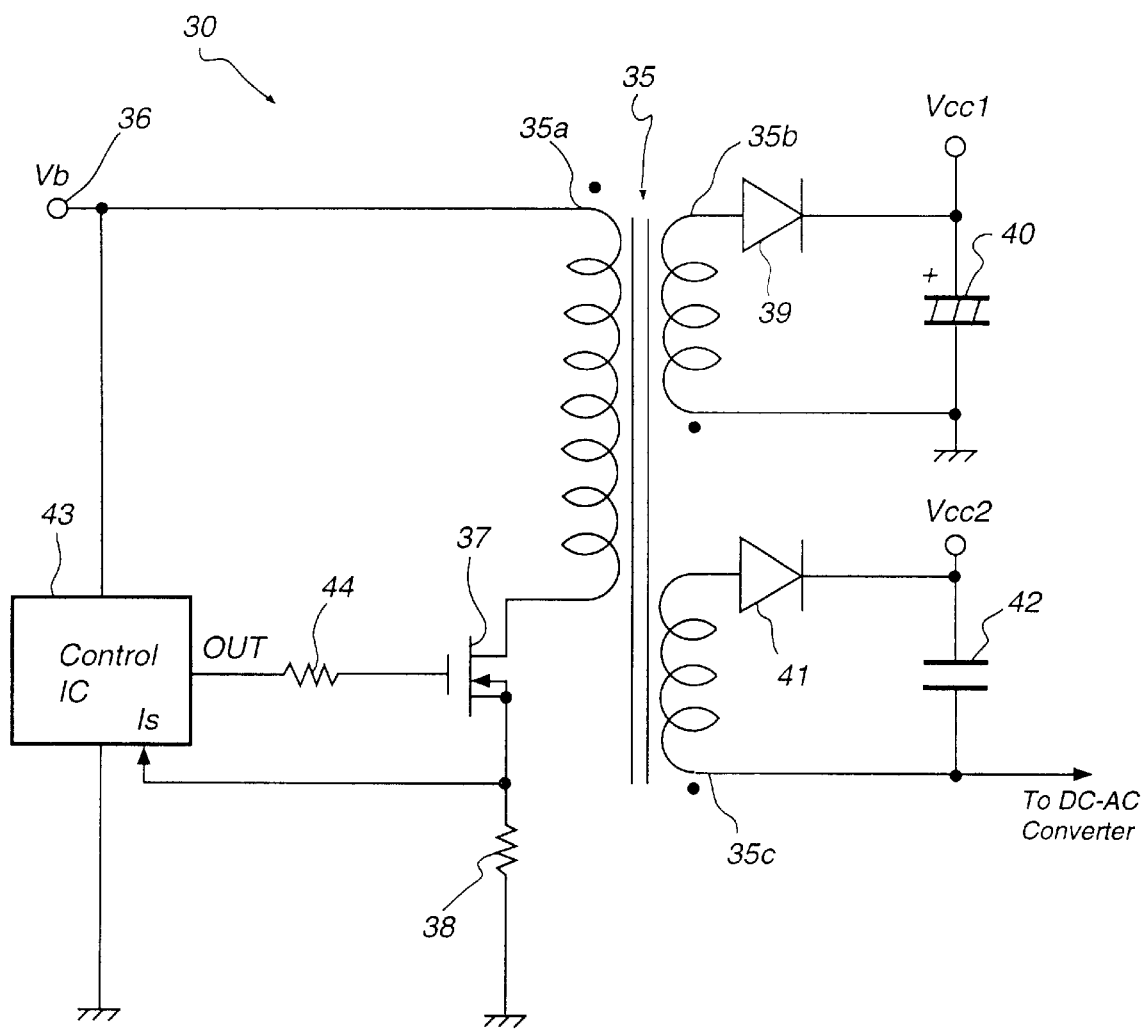
FIG. 6 is a circuit diagram exemplifying the structure of an auxiliary power supply circuit.

FIGS. 4 through 6 exemplify one embodiment of this invention as adapted to a rectangular-wave triggered type lighting circuit.

In the illustrated lighting circuit 15, a battery 16 equivalent to the aforementioned power supply 3 is connected between input terminals 17 and 17' and an ignition switch 19 is provided as a manual switch on one (18) of DC power lines 18 and 18'.

In this embodiment, a DC power supply circuit 20 to which the battery voltage is input has a flyback structure. This DC power supply circuit 20 boosts or reduces the battery voltage and sends its output to a DC-AC converter 21 at the subsequent stage. More specifically, a semiconductor switch element 20b is provided on the primary side of a transformer 20a equivalent to the aforementioned insulator means 8, and the switching action of this element 20b is controlled by a control signal from a control circuit 25 which will be discussed later. A rectifying and smoothing circuit 20c, which comprises a diode and a capacitor, is provided on the secondary side of the transformer 20a. The highpotential output terminal of the DC power supply circuit 20 is connected via a resistor 22 to one of the input terminals of the DC-AC converter 21, and one end of the resistor 22 on the side of the DC-AC converter 21 is grounded to have the same potential as that of the input terminal 17'. The resistor 22 is provided to detect the output current of the DC power supply circuit 20.

Voltage-dividing resistors 23 and 23', provided at the subsequent stage of the DC power supply circuit 20, detect the output voltage of the DC power supply circuit 20. Those voltage-dividing resistors 23 and 23' and the resistor 22 constitute the current/voltage detector. In this embodiment, the negative voltage which is detected by the voltage-dividing resistors 23 and 23' is converted by a positive voltage converter 24 to a positive voltage which is in turn sent to the control circuit 25, and the current signal detected by the resistor 22 is sent to the control circuit 25.

The control circuit 25 generates a control signal according to those detected signals and sends this control signal to the semiconductor switch element 20b of the DC power supply circuit 20 to control the output voltage of the DC power supply circuit 20, perform power control which matches with the state of a discharge lamp 28 at the activation time to shorten the activation time or reactivation time, and perform such control as to stably light the discharge lamp 28 in the normal state. Although the control circuit 25 can take a pulse width modulation type structure, it may take any structure as long as the ground terminal is connected to the input terminal 17' to have the same potential as that of this input terminal 17' and a predetermined positive supply voltage is supplied to the control circuit 25.

The DC-AC converter 21, which converts the DC output voltage of the DC power supply circuit 20 to an AC voltage having a rectangular waveform, may be designed to include a bridge circuit having plural pairs of semiconductor switch elements provided on the power supply path to the discharge lamp 28 and a drive control circuit for this bridge circuit. The DC-AC converter 21 is not limited to this structure, but may take any specific structure as long as it can generate a negative rectangular voltage.

An igniter circuit 26, located at the subsequent stage of the DC-AC converter 21, generates a trigger pulse to the discharge lamp 28, superimposes this trigger pulse on the output of the DC-AC converter 21, and applies the resultant signal to the discharge lamp 28 connected between AC output terminals 27 and 27'. It is to be noted that a metal halide lamp with rated power of 35 W, for example, is used for the discharge lamp 28.

A protection circuit 29 is provided to detect an abnormality in the discharge lamp 28 or an abnormal circuit state. This protection circuit 29 detects the lamp voltage and lamp current of the discharge lamp 28, or the output voltage or the output current of the DC power supply circuit 20, the battery voltage or the like to detect an abnormal load of the discharge lamp 28, the short-circuited state of the AC output terminals 27 and 27', the excess state and the abnormal drop or the like of the battery voltage, and stops power supply to the discharge lamp 28 upon detection of such an abnormality. In this embodiment, the detection signals associated with the output voltage and output current of the DC power supply circuit 20 is input to the control circuit 25 as power control signals and are also used in the protection circuit 29 to simplify the circuitstructure. As mentioned above, however, the control circuit 25 may take any structure as long as the ground terminal is connected to the input terminal 17' to have the same potential as that of this input terminal 17' and a predetermined positive supply voltage is supplied to the control circuit 25. The circuit structure may be modified in various ways; for instance, power supply to the control circuit 25 and other circuits may be inhibited or power cutoff switch means provided at the subsequent stage of the ignition switch 19 may be opened in order to stop power supply to the discharge lamp 28.

An auxiliary power supply circuit 30 is provided as a circuit of a separate system from the power supply path to the discharge lamp 28 to generate voltages necessary for the individual sections in the lighting circuit 15 based on the battery voltage. This auxiliary power supply circuit 30 receives the battery voltage at the subsequent stage of the ignition switch 19. In FIG. 4, the auxiliary power supply circuit 30 produces voltages "Vcc1" and "Vcc2", the former voltage "Vcc1" being supplied as the supply voltage, or a predetermined reference voltage or the original voltage of the reference voltage to the positive voltage converter 24, the control circuit 25 and the protection circuit 29 while the latter voltage "Vcc2" is supplied to the DC-AC converter 21.

FIG. 5 exemplifies the structure of the positive voltage converter 24 in which a detected voltage, obtained by dividing the output voltage of the DC power supply circuit 20 by the voltage-dividing resistors 23 and 23', is input to an inverting amplifier circuit which uses an operational amplifier 31.

The inverting input terminal of the operational amplifier 31 is connected the node between the voltage-dividing resistors 23 and 23' via a resistor 32, and is grounded via a diode 33 connected in the reverse-biasing direction. The non-inverting input terminal of the operational amplifier 31 is grounded. A feedback resistor 34 is inserted between the output terminal and the inverting input terminal of the operational amplifier 31.

Therefore, the output voltage Vout of the operational amplifier 31 becomes a positive value obtained by multiplying the inverted form of the output voltage (−Vo) of the DC power supply circuit 20 by the resistance ratios of the voltage-dividing resistors 23 and 23' and the resistors 32 and 34.

The diode 33 is provided to prevent the operational amplifier 31 from being broken when an excessive negative voltage is input to the operational amplifier 31 at the time a circuit abnormality occurs.

FIG. 6 exemplifies the structure of the auxiliary power supply circuit 30 which has a flyback structure.

The primary winding, 35a, of a transformer 35 has one end connected to a power supply terminal 36 for the battery voltage Vb and the other end grounded via a semiconductor switch element 37 such as FET and a resistor 38. The transformer 35 is designed so that two kinds of voltages are produced by secondary windings 35b and 35c. The output from the secondary winding 35b is rectified and smoothed by a diode 39 and a capacitor 40 to be the aforementioned voltage Vcc1, and the output from the other secondary winding 35c is rectified and smoothed by a diode 41 and a capacitor 42 to be the aforementioned voltage Vcc2. The two kinds of voltages may be needed in the case where, with the voltage Vcc1 being positive, the negative voltage Vcc2 different from Vcc1 becomes necessary from the viewpoint of the structure of the DC-AC converter 21. In this case, the required voltages can be acquired by adding the secondary windings and the rectifying and smoothing means to the transformer 35 as illustrated.

A control IC 43 is provided to send a signal to the semiconductor switch element 37 from its output terminal (OUT) via a resistor 44 to control the switching of the semiconductor switch element 37. The current detected by the resistor 38 is fed back as a feedback signal to the detection terminal (Is). The control IC 43 can be of a known type like a pulse width modulation control IC.

Although the current signal detected by the resistor 22 is directly sent to the control circuit 25 and the protection circuit 29 in this specific example, the current detection signal may also be supplied to the control circuit 25 and the protection circuit 29 after ponversion to a positive voltage.

Figure 7:
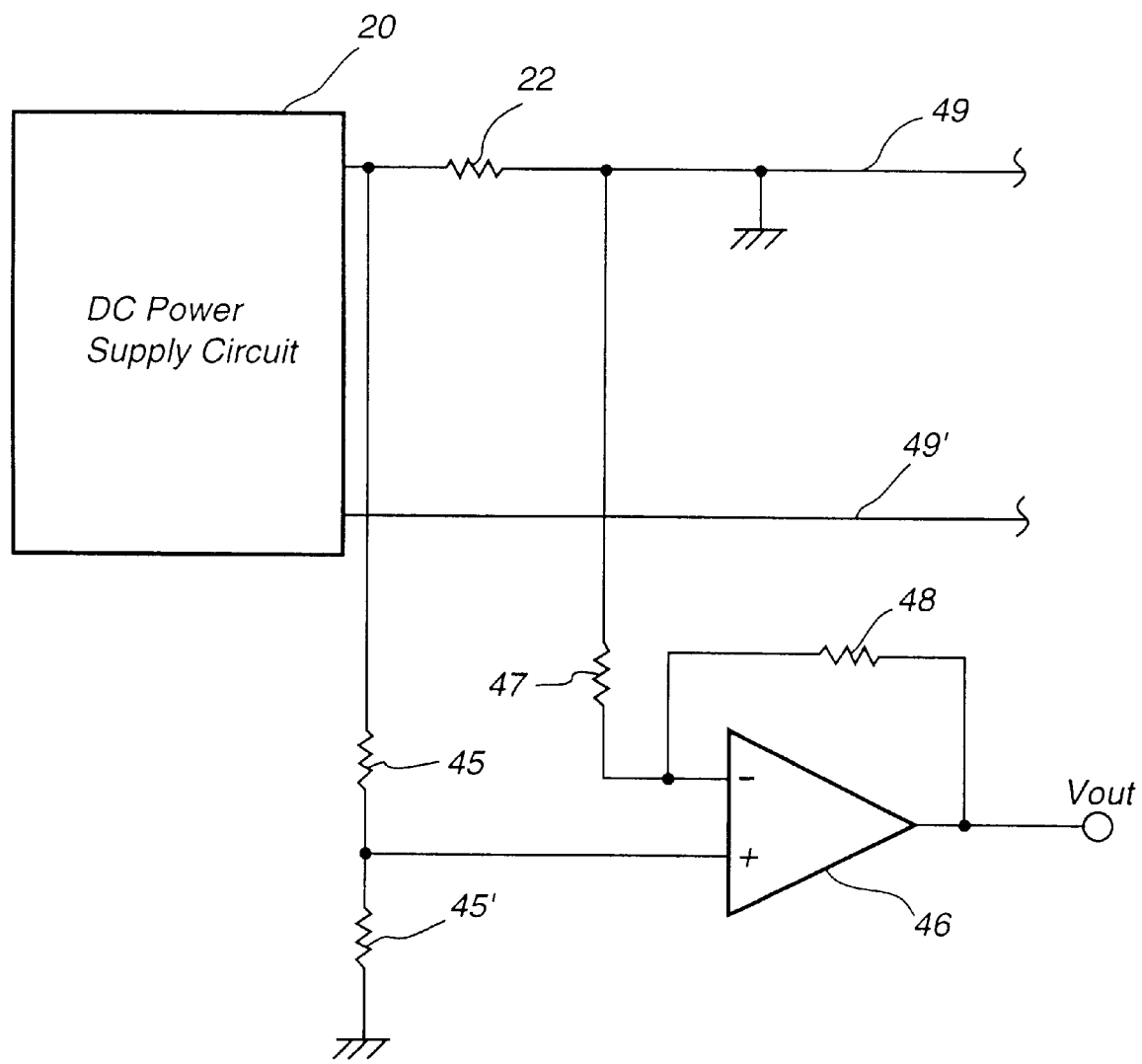
FIG. 7 is a circuit diagram exemplifying the structure of the positive voltage converter which is associated with current detection.

This modification will be discussed below more specifically. As shown in FIG. 7, voltage-dividing resistors 45 and 45' are connected to the end of the resistor 22 on the side of the DC power supply circuit 20 in such a way that a detection value resulting from the voltage division by the resistors 45 and 45' is input to the non-inverting input terminal of an operational amplifier 46, and a resistor 47 is connected to the end of the resistor 22 on the side of the DC-AC converter 21 and also connected to the inverting input terminal of the operational amplifier 46. A feedback resistor 48 is inserted between the inverting input terminal and the output terminal of the operational amplifier 46 to form a differential amplifier circuit. In this structure, a positive voltage value can be acquired as the output Vout of the operational amplifier 46. In the case where the output current of the DC power supply circuit 20 is detected by the resistor 22 provided on an output line 49 with a higher potential, it is preferable that the potential between the resistor 22 and the DC-AC converter 21 should be set equal to the potential of the input terminal 17' for the following reason in order to reduce a detection error for the output voltage of the DC power supply circuit 20. If the potential between the resistor 22 and the DC-AC converter 21 is set equal to the potential of the input terminal 17', the voltage drop at the resistor 22 directly affects the detected voltage at the time of detecting the output voltage on a lower-potential output line 49' of the DC power supply circuit 20 (i.e., the potential of the lower-potential output line 49' approximately becomes "−(VL+R IL)" where "VL" and "IL" are respectively the lamp voltage and lamp current of the discharge lamp and "R" is the resistance of the resistor 22). This requires some circuit or the like for error compensation, which complicates the circuit structure.

According to this invention, as apparent from the foregoing description, the DC power supply circuit has insulator means for insulating the input stage from the output stage, a negative AC voltage can be supplied to a discharge lamp to light the lamp merely by connecting the high-potential output terminal of the insulator means to the ground terminal, one of the input terminals to which a DC power supply is connected. Even if there is a metal member near the discharge lamp, therefore, the potential around the arc tube does not become lower than that of the discharge electrode, thus preventing metal ions from leaking from the discharge lamp. It is therefore possible to prevent the color rendering property or the like of the discharge lamp from being impaired, and the service life of the lamp from being adversely influenced by a chromaticity change in the light from the discharge lamp, both without complicating the circuit structure.

According to this invention, the lighting circuit may further comprise a control circuit for controlling an output voltage and/or an output current of the DC power supply circuit and/or a protection circuit for detecting an abnormality in the discharge lamp or an abnormality in circuitry and stopping power supply to the discharge lamp upon detection of such an abnormality, and the control circuit and the protection circuit have connection terminals connected to the ground-side one of the input terminals to which the DC power supply is connected and power supply terminals supplied with a DC supply voltage or a positive voltage obtained by converting the DC supply voltage to a predetermined voltage. This structure can ensure the reliable operations of the control circuit and the protection circuit without being influenced by a change in the output voltage of the DC power supply circuit and can thus contribute to simplifying the overall circuit structure.

In the lighting circuit, a negative detected voltage acquired by detection means for detecting the lamp voltage and/or the lamp current of the discharge lamp and/or the output voltage and/or the output current of the DC power supply circuit equivalent to the lamp voltage and/or the lamp current is converted to a positive detected voltage, so that even when a negative AC voltage is supplied to the discharge lamp, the control circuit can control the output voltage and/or the output current in accordance with the positive detected voltage.

In the lighting circuit, an abnormality in the discharge lamp or an abnormality in the circuitry can be detected based on a signal obtained by converting a negative detected voltage, acquired by detection means for detecting the lamp voltage and/or the lamp current of the discharge lamp and/or the output voltage and/or the output current of the DC power supply circuit equivalent to the lamp voltage and/or the lamp current, to a positive detected voltage, and power supply to the discharge lamp can be stopped upon detection of such an abnormality. It is therefore possible to protect the discharge lamp and the circuitry even when a negative AC voltage is supplied to the discharge lamp.

Further, a negative detected voltage associated with the output voltage of the DC power supply circuit can be easily converted to a positive voltage without complicating the circuit structure.

Moreover, a detected voltage associated with the output current of the DC power supply circuit can easily be acquired as a positive voltage without complicating the circuit structure, and an error in voltage detection is not caused by a voltage drop by the resistor which is associated with the detection of the output current at the time of detecting the output voltage of the DC power supply circuit.

What is claimed is:

1. A lighting circuit for a discharge lamp comprising:
   input terminals to which a DC power supply is to be connected;
   a DC power supply circuit for converting an input voltage from said input terminals to a predetermined voltage;
   a DC-AC converter for converting an output voltage of said DC power supply circuit to an AC voltage and supplying said AC voltage to said discharge lamp; and
   insulator means, incorporated in said DC power supply circuit, for insulating a circuit portion at an input stage from a circuit portion at an output stage, said insulator means having a high-voltage output terminal connected to a ground-side one of said input terminals, such that a negative rectangular-wave voltage is supplied to the discharge lamp.

2. The lighting circuit according to claim 1, further comprising a control circuit for controlling an output voltage and/or an output current of said DC power supply circuit, said control circuit having a connection terminal connected to said ground-side one of said input terminals to which said DC power supply is connected and a power supply terminal supplied with a DC supply voltage or a positive voltage obtained by converting said DC supply voltage to a predetermined voltage.

3. The lighting circuit according to claim 1, further comprising a protection circuit for detecting an abnormality in said discharge lamp or an abnormality in circuitry and stopping power supply to said discharge lamp upon detection of such an abnormality, said protection circuit having a connection terminal connected to said ground-side one of said input terminals to which said DC power supply is connected and a power supply terminal supplied with a DC supply voltage or a positive voltage obtained by converting said DC supply voltage to a predetermined voltage.

4. The lighting circuit according to claim 1, further comprising a control circuit for controlling an output voltage and/or an output current of said DC power supply circuit and a protection circuit for detecting an abnormality in said discharge lamp or an abnormality in circuitry and stopping power supply to said discharge lamp upon detection of such an abnormality, said control circuit and said protection circuit having connection terminals connected to said ground-side one of said input terminals to which said DC power supply is connected and power supply terminals supplied with a DC supply voltage or a positive voltage obtained by converting said DC supply voltage to a predetermined voltage.

5. The lighting circuit according to claim 2, further comprising:
   detection means for detecting a lamp voltage and/or a lamp current of said discharge lamp and/or an output voltage and/or an output current of said DC power supply circuit equivalent to said lamp voltage and/or said lamp current; and
   positive voltage conversion means for converting a negative voltage detected by said detection means to a positive voltage,
   whereby said control circuit controls said output voltage and/or said output current in accordance with an output voltage of said positive voltage conversion means.

6. The lighting circuit according to claim 4, further comprising;

detection means for detecting a lamp voltage and/or a lamp current of said discharge lamp and/or an output voltage and/or an output current of said DC power supply circuit equivalent to said lamp voltage and/or said lamp current; and positive voltage conversion means for converting a negative voltage detected by said detection means to a positive voltage, whereby said control circuit controls said output voltage and/or said output current in accordance with an output voltage of said positive voltage conversion means.

7. The lighting circuit according to claim 3, further comprising:

detection means for detecting a lamp voltage and/or a lamp current of said discharge lamp and/or an output voltage and/or an output current of said DC power supply circuit equivalent to said lamp voltage and/or said lamp current; and positive voltage conversion means for converting a negative voltage detected by said detection means to a positive voltage, whereby said protection circuit detects an abnormality in said discharge lamp or an abnormality in circuitry in accordance with an output voltage of said positive voltage conversion means and stops power supply to said discharge lamp upon detection of such an abnormality.

8. The lighting circuit according to claim 4, further comprising:

detection means for detecting a lamp voltage and/or a lamp current of said discharge lamp and/or an output voltage and/or an output current of said DC power supply circuit equivalent to said lamp voltage and/or said lamp current; and positive voltage conversion means for converting a negative voltage detected by said detection means to a positive voltage, whereby said protection circuit detects an abnormality in said discharge lamp or an abnormality in circuitry in accordance with an output voltage of said positive voltage conversion means and stops power supply to said discharge lamp upon detection of such an abnormality.

9. The lighting circuit according to claim 5, wherein said detection means detects said output voltage of said DC power supply circuit equivalent to said lamp voltage of said discharge lamp, and said positive voltage conversion means for said output voltage detected by said detection means is an inverting amplifier circuit.

10. The lighting circuit according to claim 7, wherein said detection means detects said output voltage of said DC power supply circuit equivalent to said lamp voltage of said discharge lamp, and said positive voltage conversion means for said output voltage detected by said detection means is an inverting amplifier circuit.

11. The lighting circuit according to claim 5, wherein said detection means is a resistor, provided on a higher potential output line of said DC power supply circuit, for detecting said output current of said DC power supply circuit equivalent to said lamp current of said discharge lamp, said positive voltage conversion means for a terminal voltage of said resistor is an inverting amplifier circuit, and a potential between said resistor and said DC-AC converter is equal to a potential of said ground-side input terminal to which said DC power supply is to be connected.

12. The lighting circuit according to claim 7, wherein said detection means is a resistor, provided on a higher potential output line of said DC power supply circuit, for detecting said output current of said DC power supply circuit equivalent to said lamp current of said discharge lamp, said positive voltage conversion means for a terminal voltage of said resistor is an inverting amplifier circuit, and a potential between said resistor and said DC-AC converter is equal to a potential of said ground-side input terminal to which said DC power supply is to be connected.

13. The lighting circuit according to claim 9, wherein said detection means is a resistor, provided on a higher potential output line of said DC power supply circuit, for detecting said output current of said DC power supply circuit equivalent to said lamp current of said discharge lamp, said positive voltage conversion means for a terminal voltage of said resistor is an inverting amplifier circuit, and a potential between said resistor and said DC-AC converter is equal to a potential of said ground-side input terminal to which said DC power supply is to be connected.

* * * * *